United States Patent [19]

Hamada et al.

[11] 3,755,912

[45] Sept. 4, 1973

[54] METHOD OF DRYING TREATMENT FOR COALS

[75] Inventors: Kazuyuki Hamada, Kawasaki; Miki Yamagishi, Tokyo; Kyoji Sasguri, Yokohama, all of Japan

[73] Assignee: Nippon Kokan Kabushiki Kaisha, Tokyo, Japan

[22] Filed: Jan. 22, 1971

[21] Appl. No.: 108,701

[30] Foreign Application Priority Data
Jan. 23, 1970 Japan.................................. 45/5689

[52] U.S. Cl. ........................................ 34/10, 34/57
[51] Int. Cl. .............................................. F26b 3/08
[58] Field of Search.................... 34/57 A, 57 R, 10

[56] References Cited
UNITED STATES PATENTS

| | | | |
|---|---|---|---|
| 2,629,938 | 3/1953 | Montgomery | 34/10 |
| 2,666,269 | 1/1954 | Parry | 34/10 |
| 3,040,438 | 6/1962 | Perlman | 34/57 A |
| 3,047,473 | 7/1962 | Schmidt | 34/57 A |
| 3,089,251 | 5/1963 | Helwig | 34/57 A |
| 3,192,068 | 6/1965 | Brandt | 34/57 A |
| 3,250,016 | 5/1966 | Agarwal | 34/57 R |
| 3,263,338 | 8/1966 | Gordon | 34/57 A |
| 3,537,188 | 11/1970 | Harris | 34/57 R |
| 3,563,519 | 2/1971 | Lippmann | 34/57 R |

*Primary Examiner*—William J. Wye
*Attorney*—Linton & Linton

[57] ABSTRACT

The invention relates to a method for the drying treatment of coals, where floating coals which are ground into desired grain sizes on a drying hot current whose temperature is controlled to provide a fluidized drying operation wherein the method mixes the combustion waste gas whose temperature is less than that of the desired current into one part at least of said drying hot current to control the temperature as well to make use of the enthalpy of said combustion waste gas, and besides this method maintains oxygen bearing on the drying hot current low, thereby accomplishing any one or two of the purposes of decreasing the using amount of heat-source or combustion gas for drying treatment, increasing the treating amount of drying coals and moderating the control of the temperature, and thus the method safely and exactly dries coals by means of the comparatively miniaturized drying installation and the simple measuring means.

2 Claims, 4 Drawing Figures

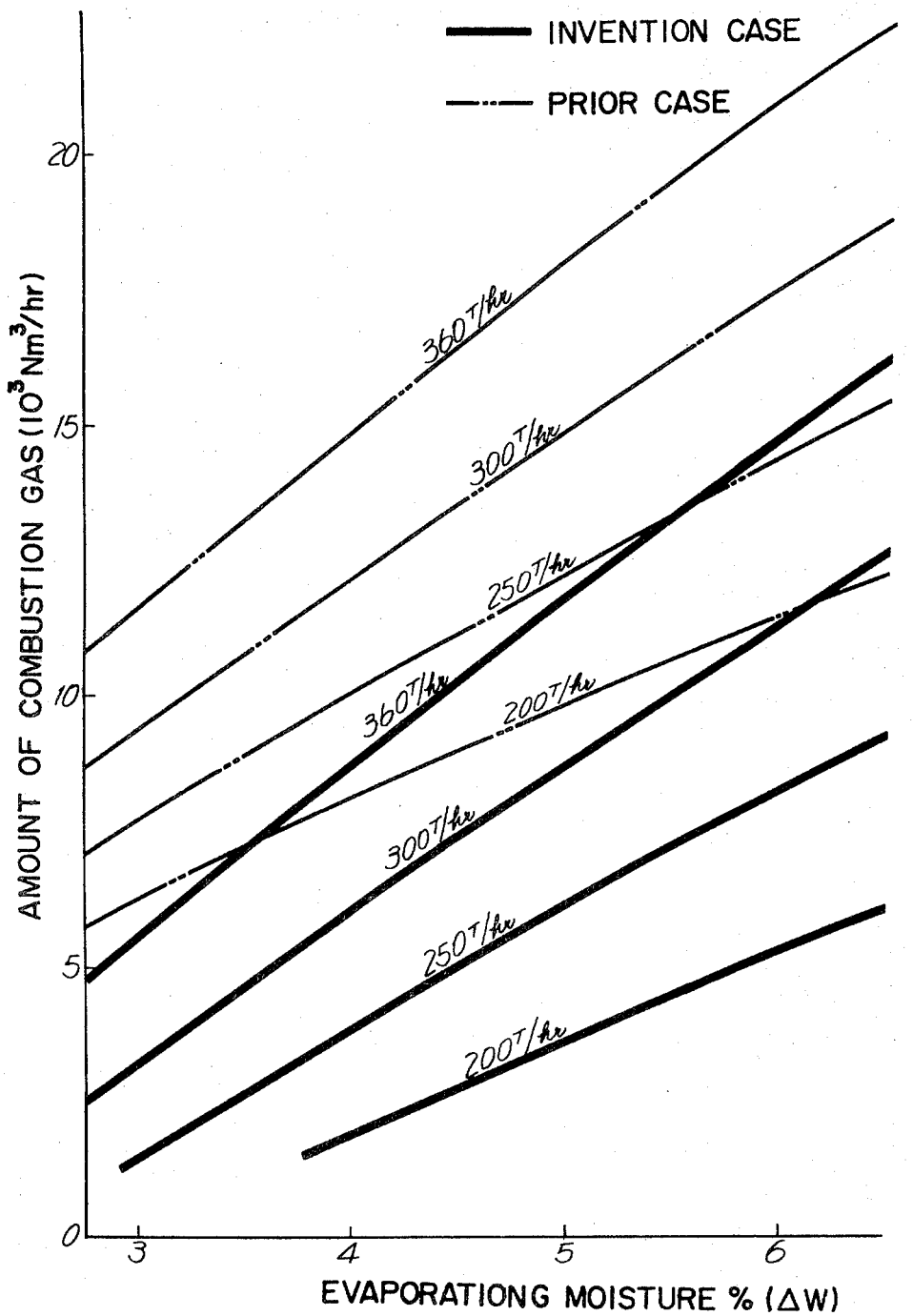

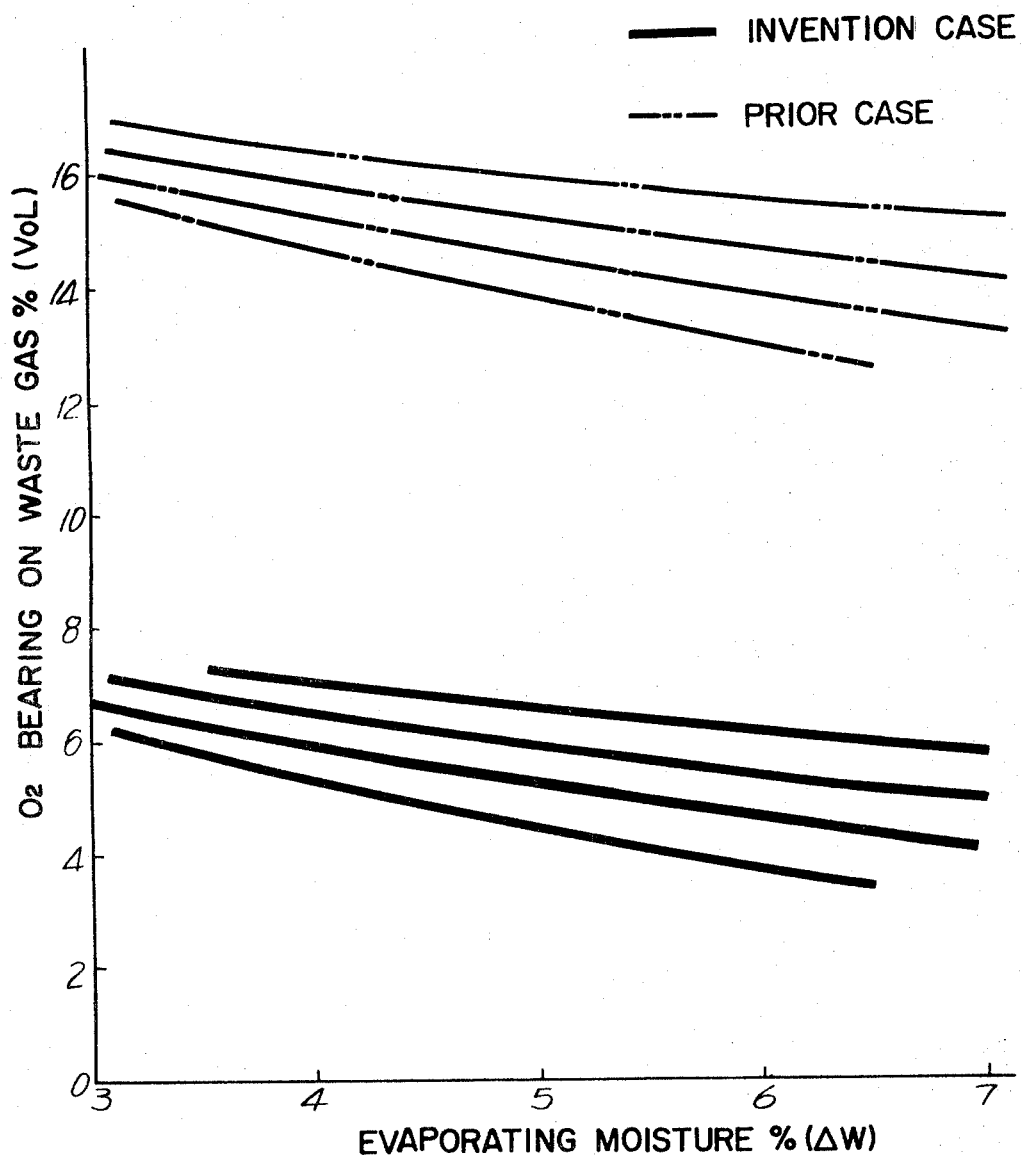

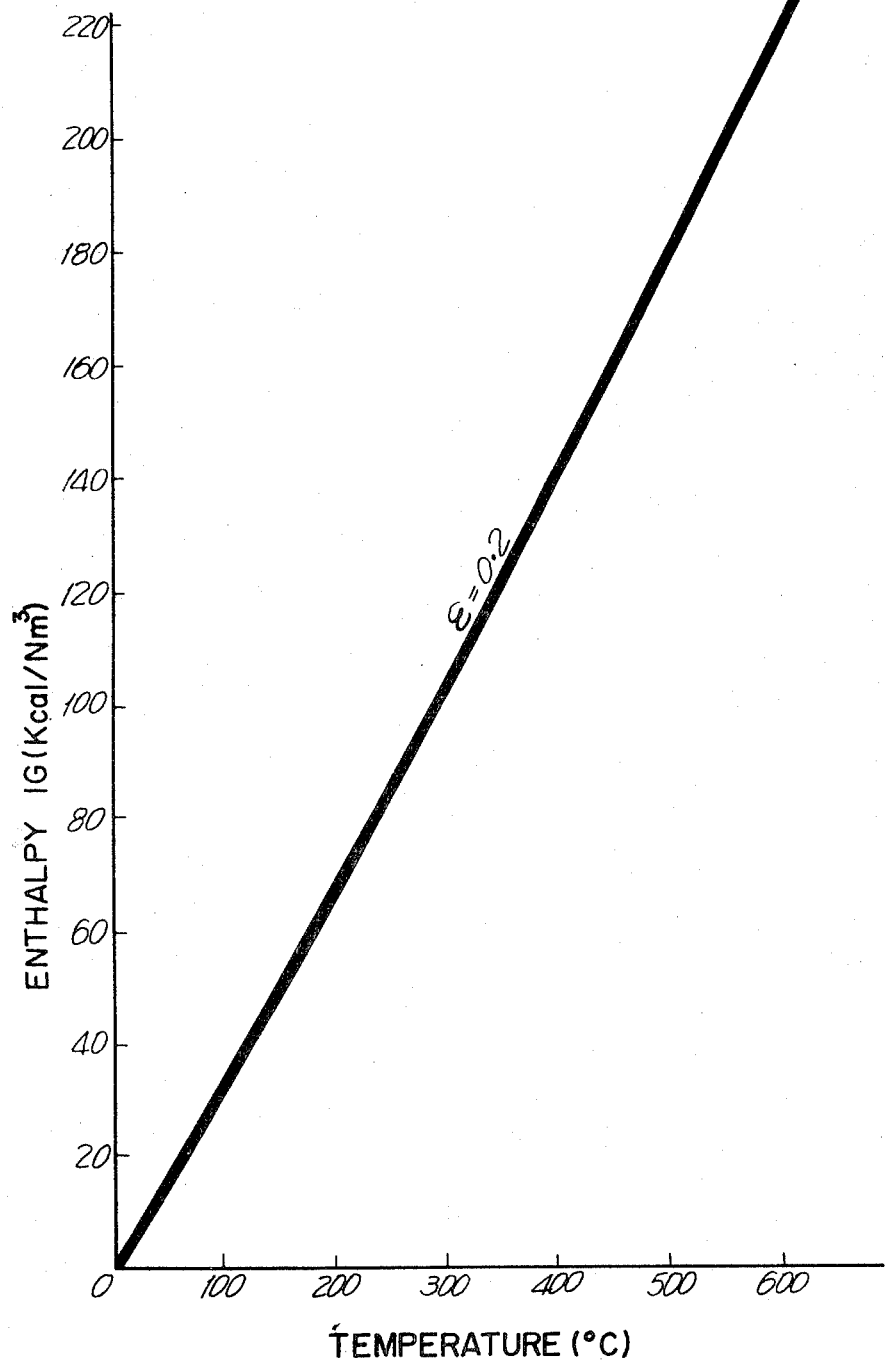

METHOD OF DRYING TREATMENT FOR COALS

BRIEF EXPLANATION

The invention is to provide a secure and advantageous drying treatment for coals to be charged into the coke oven.

When coals are dried in advance for producing cokes the amount of the coals charged to the coke oven having a certain capacity, is increased, and the coking property is heightened to produce cokes of good quality with high efficiency. The applicant has offered several methods as to producing cokes by effecting the drying treatment on coals or making use of coals with such a drying treatment. The pre-drying treatment of coals for metallurgy or heating brings about advantages in its own way for the combustion or the chemical action to treated substances. Apparantly, the fluidized drying method is the most advantageous which floats coals ground in suitable grain sizes on the drying current in order to effect this drying treatment to coals efficiently, continuously and uniformly. For obtaining such a hot current the outside cold air is mixed into the heated current to control down to the desired temperature. Although this mixture of the cold air has the merit of obtaining the desired temperature with a little mixture amount, the oxygen in the cold air inevitably goes into the drying hot current, and the drying current bearing much oxygen content transforms the quality of the ground coals to especially have great possibliity of explosion. In order to dry coals without explosion or other dangers the strict control the temperature is required for said drying hot current, and further the blowing amount thereof must be accurately maintained as well as the charging amount of coals and others must be exactly controlled for the secure operation without changing the conditions at the time of drying treatment. In case the operation even under such conditions partially stays or gets out of order or it is changed owing to any circumstances, it must be instantly stopped or controlled, otherwise accidents such as said explosion are invited, besides those stopping or controlling operations are actually very delicate, so that the operation is fairly difficult and necessitates a high degree of technique, and the measuring, driving or operating means therefor have extreme costs respectively.

The invention has succeeded in establishing, in view of said actual circumstances, a method for an economically advantageous drying treatment for coals by conducting detailed examinations and experiments, and exactly moderating or removing the technical difficulties as said above. That is to say, the basic object of the invention is to accomplish one of the following at least, decreasing the using amount of the combustion gas, increasing the treating amount of drying coals and moderating the controlling of the temperature. For these purposes, the invention proposes to make use of the combustion waste gas whose temperature is lower than that of desired current. By this way, the oxygen content bearing on the said drying hot current is considerably lowered, and the drying hot current with a small oxygen content is adopted to thereby avoid an explosion or occurrances of other accidents and at the same time does not require especial exactitude in controlling the temperature as well as the quality of said drying hot current and the amount of the charging coals. The waste gas of the combustion for various heating treatments is widely used to control the temperature. The inventors recommend the combustion waste gas out of the combustion chamber in the coke oven as the preferable waste gas. According to the inventors' investigations, the waste gas out of the combustion chamber is practically around 250° C, and conventionally it has been used for coking treatment and discharged out to the atmosphere as having no useable components. However, by using such a waste gas the pre-drying treatment for the charging coals may be performed very advantageously.

Another object is to obtain a useful drying treatment for coals together with said purposes. A decrease of the using amount of the combustion gas, an increase of the treating amount of drying coals and a moderation of controlling the temperature are all useful to this kind of fluidized drying treatment. The decrease of the using amount of the combustion gas denotes the curtailment of the heat-source and the miniaturization or simplification of the combustion apparatus, and the increase of the treating amount of drying coals elevates the treating efficiency and brings about the speedy working, and the moderation of controlling the temperature allows latitude to the controlling operation and realizes the smooth treatment. In the invention, it is possible to secure such useful effects by using said combustion waste gas and the industrial significance is very great.

A further object is to appropriately dry coals by means of a comparatively simple measuring means. In accordance to the invention where the oxygen content bearing on the drying hot current is lowered as mentioned above, the explosion or other accidents may be exactly avoided and the temperature can be widely controlled. Accordingly, the high precision and complicatedness are especially no longer necessary for the measuring means. That is, this measuring means and the operating mechanism relative thereto are enough to be comparatively simple, thereby to provide the secure and smooth drying treatment. It is obvious that the complicated and delicate measuring means does not always bring about the well fluidized drying because of various changing factors, rather frequently causes breakdowns or the like. According to the invention, the stable and smooth fluidized drying treatment is accomplished by means of the simple mechanism, and the merits are great.

Other objects and the working effects will be more apparant by the explanation of embodiments.

BRIEF EXPLANATION OF DRAWINGS

FIG. 2 is a graph showing comparisons of the invention and the prior arts concerning the relationship between the using amount of fuel gas and evaporating moisture in the drying installation;

FIG. 3 is a graph showing comparisons of the invention and the prior arts concerning oxygen content bearing on the waste gas in the drying installation; and FIG. 4 is a graph showing the relationship between the enthalpy of the combustion waste gas and the temperature.

DETAILED EXPLANATION

Figure 1:
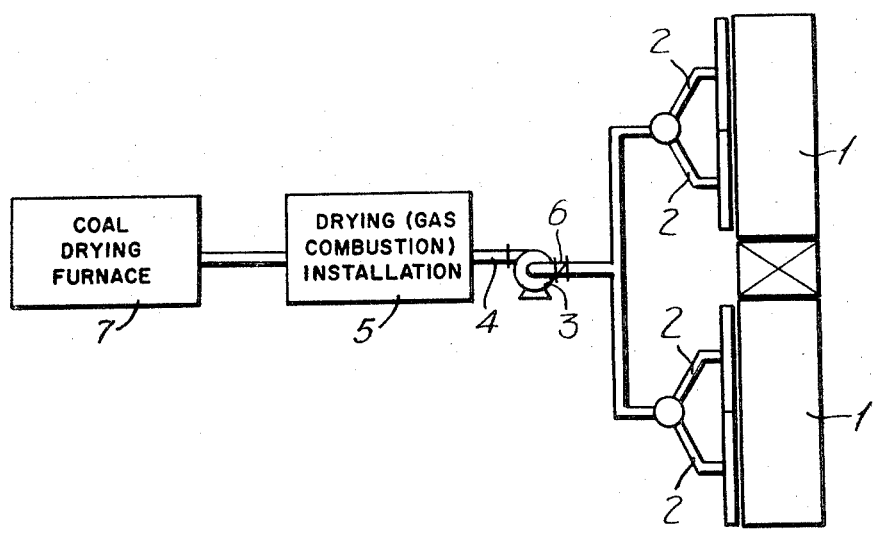
FIG. 1 is explanatory view of the outlined provision for practising the invention by making use of the combustion waste gas out of the coke oven.

To explain the embodiments of the invention with reference to the accompanying drawings, a coke oven (1) the inventors used for one example is as shown in FIG. 1. As is well known, a combustion chamber and a coal charging chamber are provided alternately to effect dry distillation of the coals by heating in the combustion chamber, and the waste gas is collected in ducts (2), and is fed to a blower (3), and is sent to a drying installation (5) through a conduit (4) and mixed therein with the combustion gas, and such a mixed gas is sent to a coal drying furnace (7) to provide a fluidized drying of ground coals. The blowing amount thereof is suitably set by means of a damper (6).

The temperature of the combustion waste gas is around 250° C as mentioned above, and FIG. 4 shows the relationship between the temperature of this waste gas and the enthalpy, from which it is found that said combustion waste gas has an enthalpy fully enough to be still used. In the invention, such a combustion waste gas is blown to said drying installation to control the temperature of the drying hot current (blast). In this manner, it was confirmed from experiments that the relationship between evaporating moisture and the amount of the combustion gas was ordinarily as in FIG. 2, which is necessary for drying coals by means of the combustion gas obtained from the mixture gas of the furnace gas and the coke oven gas which has a heat quantity of 1,100 Kcal/Nm$^3$. For example, with the amount of the combustion gas which is necessary for obtaining the evaporating 4 percent moisture from the coal of 200 T/hr the invention may perform the drying treatment for the evaporating 4 percent moisture from the coal of around 350 T/hr, and with the amount of the combustion gas necessary for the evaporating 6 percent moisture from the coal of 200 T/hr the invention can obtain the drying of 300 T/hr. FIG. 3 shows one example of the measuring results where the rate of oxygen content bearing on the waste gas in the drying installation was measured in the cases of the invention and the prior art which controls the temperature with the outer air, not using the waste gas, from which it is found that the oxygen content was decreased around 1/2.5 to 1/3. The invention can operate appropriately the more efficient drying treatment where the temperature of said hot current is further raised or the charging amount of coals is increased.

To explain the actual embodiments, for drying Japanese coals of around 10 percent moisture with the drying hot current of around 1,100 Kcal/Nm$^3$ obtained by burning the mixture gas of coke over gas (sole heat quantity: around 6,000 Kcal/Nm$^3$) and the furnace gas (sole heat quantity: around 700 Kcal/Nm$^3$), said Japanese coals were so ground that grains of around 1mm diameter were 30 percent, and 90 percent was less than 3mm diameter, and thus ground coals of average grain size being around 0.45mm diameter were supplied to the fluidized drying means to be floated on the hot blast which is oridinarily 450° to 500° C and is limited to the maximum temperature of 600° C, at the blowing speed of 0.8m/sec to continuously perform the drying treatment so that evaporating moisture was 5 percent. In such a case, when the waste gas having the composition of $N_2$: 71.14 percent, $O_2$: 1.74 percent, $CO_2$: 23.66 percent and $H_2O$: 3.46 percent out of the combustion chamber was sent into said hot blast at 93,000 Nm$^3$/hr to dilute it and the temperature was controlled, the using amount of said combustion gas was 11,600 Nm$^3$/hr.

When it was compared with the prior art which controls the temperature with the outer air, in the prior art the using amount of the combustion gas was 17,700 Nm$^3$/hr (the amount of the diluting air was around 9,000 Nm$^3$/hr) and the invention decreased the using amount of the combustion gas a little over one-third.

As mentioned above, the invention makes use of the waste gas for the drying hot current (combustion gas) to dry coals, thereby greatly decreasing the consumption of the fuel necessary for said drying treatment and developing the operating unit, and further decreasing the oxygen content bearing on the drying hot current to avoid explosion and other dangers, and it is possible to improve the safety in the drying provision, so that the delicate and high degree control is not always necessary, and the secure operation is possible by means of the comparatively simple measuring means.

We claim

1. In a fluidized drying operation wherein coals of a desired grain sizes are floated on a drying hot current provided by a combustion gas, a method of lowering the temperature and reducing percentage of oxygen in said drying hot current consisting in mixing a combustion waste gas of a temperature which is less than that of the desired drying current and whose oxygen content is small, into the combustion of the drying hot current gas to adjust the temperature of said combustion gas to between 450° and 600° C making use of the enthalpy in said combustion waste gas.

2. A method according to claim 1, wherein said combustion waste gas is obtained from a coke oven waste gas having a temperature of around 250° C.

* * * * *